United States Patent [19]

Vajs et al.

[11] Patent Number: 4,743,625
[45] Date of Patent: May 10, 1988

[54] FIRE RETARDANT MIXTURE FOR PROTECTION OF SUITABLE COMPOSITE PRODUCTS

[76] Inventors: Lubomir Vajs, 5580 Sheppard Ave. E., Toronto, Ontario, Canada, M1B 2L3; Daniel M. Pettit, 146 Connaught Cr., Bolton, Ontario, Canada, L0P 1A0

[21] Appl. No.: 45,519

[22] Filed: May 4, 1987

Related U.S. Application Data

[63] Continuation-in-part of Ser. No. 889,273, Jul. 25, 1986, Pat. No. 4,663,226.

[51] Int. Cl.$^4$ .................... C08J 9/00; C09K 21/14
[52] U.S. Cl. .................... 521/122; 252/606; 428/305.5; 428/310.5; 428/921; 521/906; 521/907; 523/179
[58] Field of Search ............ 252/606; 428/305.5, 428/310.5, 921; 521/122, 906, 907; 523/179

[56] References Cited

U.S. PATENT DOCUMENTS

| | | | |
|---|---|---|---|
| 4,265,963 | 5/1981 | Matalon | 428/305.5 |
| 4,324,835 | 4/1982 | Keen | 428/305.5 |
| 4,529,467 | 7/1985 | Ward et al. | 428/921 |
| 4,530,877 | 7/1985 | Hadley | 428/921 |
| 4,572,862 | 2/1986 | Ellis | 428/921 |
| 4,588,523 | 5/1986 | Tashlick et al. | 428/921 |
| 4,594,368 | 6/1986 | Salyer et al. | 428/921 |
| 4,599,369 | 7/1986 | Malcom-Brown | 523/179 |
| 4,656,095 | 4/1987 | McAllister et al. | 523/179 |

*Primary Examiner*—William J. Van Balen

[57] ABSTRACT

The present invention relates to fire resistance compounds which can be added to a composite man-made product. In particular, the invention relates to a compound which provides fire resistance by the formation of two stages of fire protection and is added to plastic products during the manufacture thereof.

19 Claims, 1 Drawing Sheet

FIRE RETARDANT MIXTURE FOR PROTECTION OF SUITABLE COMPOSITE PRODUCTS

This is a continuation-in-part of application Ser. No. 889,273 filed July 25, 1986, now U.S. Pat. No. 4,663,226.

BACKGROUND OF THE INVENTION

Intumescent paint-type coatings for providing fire resistance or fire protection of an underlying product are well known and produce a foam-type cellular layer when exposed to temperature in excess of about 200° C. The produced foam layer insulates the underlying product and protects the same from direct contact with the flame. Intumescent paints are known for providing protection to products up to about 650° C., depending upon the intumescent used. At a temperature of about 650° C., the intumescent layer itself is consumed or starts to decompose whereby the protection to the underlying product is reduced or lost. In some cases, the structural characteristics of the underlying product change substantially with heat and fillers such as chlorinated paraffins have been added to the intumescent coatings to provide additional structural rigidity. The intumescent coatings bubble and foam when exposed to high temperatures to produce a multicellular insulation. These coatings contain a source of carbon, a phosphorous releasing material which when exposed to higher temperatures decomposes to produce phospheric acid, and a source of non-flammable gases which acts as a blowing agent.

Coatings suffer in that any breakdown therein exposes product that is readily combustible.

In the case of high temperature protective coatings, vitrifying agents including silicon-type vitrifying materials have been used. However, the weight associated with a silicon vitrifying material used to protect an underlying product is quite high. Silicon-type materials may protect the underlying product, however, these layers tend to conduct heat readily and, therefore, are poor insulators.

It is also known to incorporate intumescent materials in a plastic foam product and in other cases, non-combustible filler materials such as chlorinated paraffin are added directly to the product. These materials add fire resistance as they are exposed to the heat of combustion.

Presently, there is a need to provide protection or fire resistance of foam urethane products commonly used as cushions in the manufacture of seats. In the airline industry, new standards have been adopted which require stringent fire resistant characteristics. Furthermore, weight considerations become important as well as the comfort of the treated seat. For example, there are available fire resistant fabrics in which the cushions could be wrapped, however, these tend to be fairly expensive and result in a uncomfortable seat as the natural resiliency and texture of the cushion is lost or reduced. A second solution to the airline seat cushion problem has been the use of new silicone foam cushions which are made of silicone elastomers, however, this results in a substantial increase in the weight of the cushions as well as resulting in an expensive cushion. One such foam cushion is sold under the trade mark POLYVOLTAC.

SUMMARY OF THE PRESENT INVENTION

According to the present invention, a mixture is added during the manufacture of the product to add fire retardance or resistance. This mixture contains a known intumescent and a known vitrifying agent which cooperate to provide a protective surface layer which reduces the combustibility of the product. This system first produces an intumescent foam layer and subsequently vitrifies a suitable agent carried in the intumescent foam layer to lock the layer and maintain the fire resistance of the layer. Therefore, the vitrifying agent locks or stabilizes such that the carbon of the intumescent foam layer is not consumed at high temperatures. The vitrifying agent also stabilizes or adds strength to the intumescent foam layer such that it is maintained on the surface of the product and reduces or prevents the substrate from dripping and subsequently destroying the protective intumescent layer. This vitrified intumescent protective layer also acts as a flame arrestor.

Although this mixture has particular application in combustible foam products, it is suitable for other man-made products requiring fire protection such as composite wood products, composite paper products, etc., where the mixture can be introduced into and dispersed within the product.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
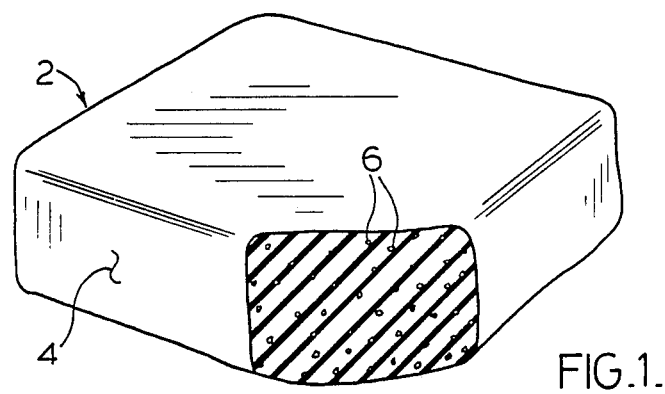
FIG. 1 is a perspective view of a cut away through a block of urethane foam to which the mixture has been added.

The urethane or polyurethane foam block 2 shown in the drawings, has an outer peripheral surface 4 and includes particles 6 of the fire retardant mixture distributed throughout the foam block. The particles are preferably ground and of a size of less than 50 microns and preferably 6 to 12 microns. The particles are basically carried by the foam product and only come into play when the product is exposed to combustible temperatures. The natural resiliency of the foam is substantially maintained and the density of the foam is increased somewhat. The fire retardant mixture includes a known intumescent material dispersed throughout the foam which, when exposed to heat experienced in combustion, progressively produces a protective cellular layer. A substantial amount of research has been done on intumescent materials of this type (carbon base, including a catalyst which produces phosphoric acid in combination with appropriate blowing agents), and they are normally employed in paints. The exposed intumescent material at the surface produces a cellular foam layer in the same manner or at least in substantially the same manner as in known intumescent fire protective coatings. At least some of the vitrifying material is present at the surface and commences vitrification at a temperature above the initial formation of the protective cellular foam layer. Vitrification of the vitrifying agent essentially locks the protective intumescent material in a cellular foam state and protects this cellular layer from decomposition and/or suppresses dripping of the underlying substrate to increase the effective temperature range of the intumescent cellular foam layer and the insulation properties thereof. The vitrifying material cooperates with the intumescent to provide a second stage of protection. In some cases, the urethane foam block will collapse due to exposure to a flame and initially the intumescent will follow the surface of the foam until the build-up of the intumescent layer and vitrification stops the action by fully protecting the underlying foam or having sufficient rigidity to support itself. In this way, some of the foam product is consumed to build up the protective layer and thus the problem of melting and dripping of the melted foam is reduced. It is preferable to have limited controlled combustion to dripping of the product where spreading of the fire is more prevalent.

Suitable vitrifying agents include silica powder or nepheline syenite powder or sodium tetraborate or hydrated magnesium silicate, or aluminum silicate or silicon resins. Sodium tetraborate provides protection up to approximately 740° C. and, therefore, is a low temperature protection system. The silica powder can provide protection up to about 1500° C., whereas the hydrated magnesium silicate provides protection to about 1400° C. Nepheline syenite powder provides protection to about 1600° C. with aluminum silicate protecting up to 1800° C. and silicon resins protecting up to about 1500° C. This listing is meant to be representative of suitable vitrifying agents and should not be considered as all inclusive. Thus, the vitrifying agent increases the effective maximum temperature of the intumescent alone by at least 100° C. and in some cases more than doubles the prior maximum temperature.

The addition of the fire retarding mixture does not substantially alter the characteristics of the urethane foam with respect to compression and resiliency. The particles of this mixture, when exposed to high temperature heat, produces a thick cellular foam layer which is strengthened by vitrification of an agent carried therein.

It has been found a mixture containing 17 to 40 parts by weight of ammonium polyphosphate, 17 to 27 parts by weight of pentaerythritol, 7 to 27 parts by weight of dicyandiamide, and 5 to 50 parts by weight of a vitrifying agent preferrably silica powder or nepheline syenite powder or sodium tetraborate or hydrated magnesium silicate or aluminum silicate or silicon resin, has proven acceptable. If sodium tetraborate is used, protection of the foam up to about 740° C. can be obtained, whereas as silica powder can provide protection to 1500° C., hydrated magnesium silica can provide protection up to 1400° C., nepheline syenite powder can provide protection up to about 1600° C., aluminum silicate can protect up to 1800° C. and silicon resins can protect up to 1500° C. One particularly suitable coating includes 21 parts diammonium phosphate, 13 parts pentaerythritol, 7 parts dicyandiamide, and 10 parts vitrifying agent.

The fire retarding mixture is distributed throughout the foam product or, in fact, is loaded into the product when manufactured. Up to 30% by weight has been added to a compressible seat cushion product and the degree of fire resistance or retardancy is increased as the percentage added increases. Adding as little as 10% has also proven to increase the fire resistance of the product. Different foam products can accept different levels of solids, for example, most rigid foams can accept higher solid concentrations. Depending upon the end product and the requirements thereof, the amount of the mixture can be determined. In addition, non-combustible fillers such as talc can also be added.

The additives as taught herein, whether used alone or in suitable combination with other fillers, reduces dripping associated with the combustion of plastic products and thereby reduces the possibility of the fire spreading.

This mixture is particularly useful with foam products, however it does have application for use in other plastic products where some degree of fire resistance is necessary. Also, other products such as rubber, paper or other reconstructed man-made products may be suitable where the mixture can be easily added or applied.

Although vitrification locks the intumescent foam, other known materials which add strength can be used. For example, chlorinated paraffin is a known additive. These additives do not lock but cooperate with the intumescent to add strength thereto in the normal operating range. The vitrifying agents extend the temperature range and change the performance of the intumescent or fire retardant alone as a cooperative fire retarding insulative layer is formed.

The mixture or combination of additives described herein is suitable for protecting rigid and or flexible foam shapes or other products which, unless protected, would aggressively support combustion. The two stage protection system is provided by the initial formation of a protective intumescent foam layer which is then locked or stabilized by a vitrifying agent disbursed therethroughout, and being part of the intumescent forming composition.

The vitrifying agent in combination with the intumescent foam provides protection to a substantially higher temperature and has advantages with respect to weight and ease of application. This mixture, when appropriate vitrifying agents are selected and in appropriate concentrations, can protect the product to temperatures in excess of 1000° C. for at least a short duration and in some applications in excess of 1800° C. The mixture or additives have particular application when incorporated in flexible foam seats for use in airlines.

The mixture is easy to add during the manufacture of a foam product, and does not appreciably increase the weight of the seats. The final weight of the treated seats of standard urethane foam is substantially less than the weight of the same seat when made of a known non-combustible foam such as a foam made of silicone elastomers. This mixture adds in the order of about 1 pound per cubic foot, significantly less than known non-combustible foams.

Suitable additives to be added to a product comprise by weight:
 7 to 40 parts of ammonium or diammonium phosphate;
 17 to 37 parts of pentaerythritol;
 17 to 27 parts of dicyandiamide; and
 5 to 50 parts of a suitable vitrifying material.

In addition, 5 to 50 parts of chlorinated paraffin may be added.

The application of this non-combustible foam has been described with respect to a constant foam product, however the non-combustible foam could be applied or formed to the exterior and form a peripheral protective layer. Such a system would allow a higher density of the additives at the outer surfaces. The amount of additive incorporated in the product will vary with the product and the degree of fire retardancy required.

This fire protection system has application with respect to rigid and/or flexible foam shapes used in furniture for institutional and home application, the foam cushions used in automobiles, building products such as wall boards, ceiling tiles, mattresses and, where appropriate, fire walls and doors. In addition, such seat cushions as used in theatres, hospitals, penitentiaries, stadiums, meeting halls, recreational vehicles, etc., could also advantageously use this system which does not substantially alter the performance of these seats, while protecting these seats from combustion, for at least a limited time. Other applications are also possible.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In a synthetic plastic foam product a fire retardant dispersed in the foam product, said fire retardant comprising
    a known carbon base intumescent material which produces a protective cellular foam layer when exposed to combustion temperatures, and
    a vitrifying agent which locks the intumescent cellular foam layer when exposed to a temperature sufficient to activate said vitrifying agent.

2. A plastic foam product having dispersed therein fire retarding materials, said fire retarding materials comprising
    a known carbon base intumescent material which produces a protective cellular foam layer when exposed to combustion temperatures, and
    a vitrifying agent which locks the intumescent cellular foam layer when exposed to a temperature sufficient to activate said vitrifying agent.

3. A plastic foam product as claimed in claim 2, wherein said intumescent material and said vitrifying agent are selected according to the temperature requirements of the product.

4. A plastic foam product as claimed in claim 2, wherein the intumescent material and vitrifying agent are at least found in an outer peripheral area of said product and the density of these materials controls the degree of fire retardance.

5. A plastic foam product as claimed in claim 4, wherein said vitrifying material vitrifies at a temperature of about 200° C. to maintain the layer of intumescent foam on the exterior of the product when the product is subjected to the heat of combustion.

6. A plastic foam product as claimed in claim 5, wherein said intumescent and vitrifying material are evenly distributed throughout the product.

7. A fire retarding mixture to be added to a suitable composite product of predetermined shape comprising;
    a known carbon base intumescent material which when exposed to heat of combustion produces a protective cellular foam layer;
    and a vitrifying agent which locks the intumescent protective layer when exposed to a temperature which would otherwise cause decomposition of the foamed intumescent, said vitrifying agent locks the intumescent protective layer by vitrifying and combining therewith to form an enhanced protective layer.

8. A mixture as claimed in claim 7, wherein said vitrifying material is selected from the group consisting of hydrated magnesium silicate, silica powder, silicon resins, nepheline syenite, and sodium tetraborate.

9. A mixture as claimed in claim 7, wherein said mixture comprises by weight;
    7 to 40 parts of diammonium phosphate,
    17 to 37 parts of pentaerythritol,
    17 to 27 parts of dicyandiamide, and
    5 to 50 parts of said vitrifying material.

10. A mixture as claimed in claim 9, wherein said mixture includes 5 to 50 parts of chlorinated paraffin.

11. A mixture as claimed in claim 9, wherein said vitrifying material is selected from, or a suitable mixture of, the following materials: silica powder nepheline syenite powder, sodium tetraborate, hydrated magnesium silicate, aluminium silicate and silicon resins.

12. A mixture as claimed in claim 7, comprising;
    7 to 40 parts by weight of ammonium polyphosphate,
    17 to 37 parts by weight of pentaerythritol,
    17 to 27 parts by weight of dicyandiamide, and
    5 to 50 parts by weight of vitrification agent.

13. A mixture as claimed in claim 12, including 5 to 50 parts by weight of chlorinated paraffin.

14. A mixture as claimed in claim 12, wherein said agent is selected from, or the mixture of, the following materials: silica powder, nepheline syenite powder, sodium tetraborate, hydrated magnesium silicate, aluminium silicate and silicone resins.

15. A method of forming a two stage fire retarding surface layer of a product when exposed to the heat of combustion comprising;
    forming an initial intumescent cellular foam layer on a product from intumescent material contained within the product and exposed to the surface of the product as the product is partial consumed by combustion and,
    vitrifying a vitrifying agent within said foam layer at a temperature less than the temperature at which said intumescent layer decomposes, said agent being originally within said product and accumulating at the surface of the product as the product is partially consumed, said agent locking the said intumescent cellular foam layer.

16. A method of producing a fire retardant plastic foam product comprising;
    mixing with the polymer resin and blowing agent,
    a known carbon based intumescent foaming material such that said intumescent is dispersed throughout the foam product and a known vitrifying material of the type suitable for a fire protection layer when vitrified, said vitrifying material being dispersed throughout the foam product, said product, when exposed to the heat of combustion, collapsing at the surface thereof causing a surface accumulation of intumescent and vitrifying material, the accumulated intumescent material, when exposed to a temperature of about 200° C., producing a cellular foam layer which provides a first stage of fire protection for the foam product, the accumulated vitrifying material vitrifying after substantial formation of said cellular foam layer, resulting in said layer and said vitrifying agent forming a stable insulating layer which renders said product less combustible than an untreated product.

17. A method as claimed in claim 15, wherein said vitrifying material starts to vitrify at about 600° C.

18. A method as claimed in claim 14, wherein said vitrifying material is selected from the group consisting of hydrated magnesium silicate, silica powder, silicon resins, nepheline syenite, and sodium tetraborate.

19. A method as claimed in claim 16, wherein said stable insulating layer acts as a flame arrestor preventing flames from penetrating further into the product, reducing melting and subsequent dripping of the remaining product, and thus rendering said product less combustible than an untreated product.

* * * * *